(12) United States Patent
Ge

(10) Patent No.: US 9,719,498 B2
(45) Date of Patent: Aug. 1, 2017

(54) SYSTEM AND METHOD FOR RECOVERING ENERGY IN A MACHINE

(71) Applicant: Caterpillar Inc., Peoria, IL (US)

(72) Inventor: Xinyu Ge, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 74 days.

(21) Appl. No.: 14/724,960

(22) Filed: May 29, 2015

(65) Prior Publication Data
US 2016/0348653 A1 Dec. 1, 2016

(51) Int. Cl.
*B60K 6/00* (2006.01)
*F03G 7/08* (2006.01)
*B60G 13/14* (2006.01)

(52) U.S. Cl.
CPC ............. *F03G 7/08* (2013.01); *B60G 13/14* (2013.01); *B60G 2300/60* (2013.01)

(58) Field of Classification Search
CPC .... F03G 7/08; F03G 7/00; F15B 1/033; F15B 1/024; F15B 1/00; F15B 1/02; F15B 1/027; F15B 21/14; B60K 25/10; B60K 2025/106; E02F 9/2091; E02F 9/2217; B60G 2300/02; B60G 2300/60; B60G 2300/09
See application file for complete search history.

(56) References Cited

U.S. PATENT DOCUMENTS

| | | | |
|---|---|---|---|
| 5,850,592 A | 12/1998 | Ramanathan | |
| 6,037,901 A | 3/2000 | Devier et al. | |
| 6,725,581 B2 * | 4/2004 | Naruse | E02F 9/2217 37/348 |
| 6,954,689 B2 | 10/2005 | Hanson et al. | |
| 7,743,896 B2 | 6/2010 | Vanhees et al. | |
| 7,885,285 B2 | 2/2011 | Fukuyama | |
| 7,908,852 B2 * | 3/2011 | Zhang | E02F 9/2217 60/414 |
| 8,108,242 B2 | 1/2012 | Arakawa | |
| 8,170,747 B2 | 5/2012 | Chen et al. | |
| 8,191,669 B2 * | 6/2012 | Verbrugge | B60K 25/10 180/300 |

(Continued)

FOREIGN PATENT DOCUMENTS

| | | |
|---|---|---|
| FR | 2701468 | 8/1994 |
| GB | 2466553 | 6/2010 |

*Primary Examiner* — James M Dolak
(74) *Attorney, Agent, or Firm* — James S. Bennin

(57) ABSTRACT

An energy recovery system for a first machine includes a cylinder member, and a piston slidably disposed in the cylinder member and operatively coupled to a frame of the first machine. The piston and the cylinder member together define a chamber configured to receive a hydraulic fluid. The energy recovery system includes an accumulator in fluid communication with the chamber and a first valve assembly for regulating a flow of the hydraulic fluid from the chamber to the accumulator. The energy recovery system includes a controller configured to receive a signal indicative of a parameter of a payload that is to be received from a second machine during a work cycle thereof. The controller is configured to control the first valve assembly, during the work cycle of the second machine, to at least partially open the fluid communication between the chamber and the accumulator based on the received signal.

17 Claims, 4 Drawing Sheets

(56) References Cited

U.S. PATENT DOCUMENTS

| | | | |
|---|---|---|---|
| 8,362,629 B2 * | 1/2013 | Weber | F04B 1/04 187/224 |
| 8,364,189 B2 | 1/2013 | Mintah et al. | |
| 8,376,100 B2 | 2/2013 | Avadhany et al. | |
| 8,583,361 B2 | 11/2013 | Lewis et al. | |
| 8,636,120 B1 | 1/2014 | Rogers et al. | |
| 8,683,793 B2 * | 4/2014 | Bergstrom | E02F 9/2217 60/414 |
| 8,850,806 B2 * | 10/2014 | Zhang | E02F 9/123 60/327 |
| 9,151,018 B2 * | 10/2015 | Knussman | E02F 9/2217 |
| 9,242,633 B2 * | 1/2016 | Forslow | B60K 6/28 |
| 9,388,828 B2 * | 7/2016 | Hillman | F15B 1/02 |
| 9,421,873 B2 * | 8/2016 | Ishida | B60L 11/1809 |
| 2005/0002354 A1 | 1/2005 | Kelly et al. | |
| 2007/0107964 A1 * | 5/2007 | Bunsmann | B60G 7/003 180/165 |
| 2010/0006362 A1 | 1/2010 | Armstrong | |
| 2013/0081383 A1 | 4/2013 | Knussman | |
| 2014/0060946 A1 | 3/2014 | Willi | |

* cited by examiner

SYSTEM AND METHOD FOR RECOVERING ENERGY IN A MACHINE

TECHNICAL FIELD

The current disclosure relates to an energy recovery system in a machine, and more particularly to a system and method for recovering shock energy in the machine during operation.

BACKGROUND

Typically, machines, such as mining trucks are designed to carry a payload from one location to another. Generally, during loading the machine with such payload, the machine may experience a high load impact. In such cases, a frame of the machine may experience vertical forces and/or acceleration due to a weight of the payload. Other methods and systems, such as using shock absorbers have been implemented in the past to dampen these forces. Furthermore, recovery systems of these shock energies are designed to transfer the kinetic energy of the frame to either electric energy or hydraulic potential energy. However, transferring all the kinetic energy may pose challenges to the reliability of springs used in the shock absorbers, since plastic deformation might occur when the weight is beyond certain limit. Further, such designs optimized for energy recovery may also lead to a harsher ride for the machine due to sudden dampening.

For reference, U.S. Patent Publication Number 2010/0006362 (hereinafter the '362 patent publication) relates to a vehicle suspension kinetic energy recovery system that generates useful energy from the up-and-down motion of a vehicle suspension caused by roadway irregularities as the vehicle travels down the roadway. In one embodiment, a piston-type pump mounted between the frame and the suspension charges a high-pressure accumulator for driving hydraulic motors, e.g., power windows, power seats, alternator, etc. In another embodiment, electricity is generated directly by a conductor moving with respect to magnetic field as a result of the up-and-down motion of the vehicle suspension.

However, optimizing the system of '362 patent publication in order to achieve a balance between smoother rides for the machine and also effectively recover the energy may be difficult due to various reasons. For example, it may be difficult to effectively predict an impact caused due to the roadway irregularities.

SUMMARY OF THE DISCLOSURE

In one aspect of the current disclosure, an energy recovery system for a first machine in communication with a second machine is provided. The energy recovery system includes a cylinder assembly. The cylinder assembly includes a cylinder member and a piston slidably disposed in the cylinder member. The piston is operatively coupled to a frame of the first machine. The piston and the cylinder member together define a chamber configured to receive a hydraulic fluid therein. The energy recover system also includes an accumulator disposed in fluid communication with the chamber to receive the hydraulic fluid and a first valve assembly disposed in fluid communication with the accumulator and the chamber. The first valve assembly is configured to regulate a flow of the hydraulic fluid from the chamber to the accumulator. The energy recovery system also includes a controller configured to communicate with the second machine and control the first valve assembly. The controller is also configured to receive a signal indicative of a parameter of a payload that is to be received by the first machine from the second machine during a work cycle of the second machine. The controller is further configured to control the first valve assembly, during the work cycle of the second machine, to at least partially open the fluid communication between the chamber and the accumulator based on the received signal.

In one aspect of the current disclosure, a method of recovering a kinetic energy due to a motion of a frame of a first machine while receiving a payload from a second machine is provided. The method includes communicating with the second machine to determine a work cycle for the second machine. The second machine is configured to provide the payload to the first machine during the work cycle. The method also includes determining a parameter of the payload that is to be received by the first machine during the work cycle for the second machine. The method further includes at least partially opening a fluid communication between a chamber of a cylinder member of the first machine and an accumulator of the first machine during the work cycle based on the parameter of the payload to at least partially recover the kinetic energy. The chamber is configured to receive a hydraulic fluid therein and the accumulator is configured to store the hydraulic fluid.

In one aspect of the current disclosure, a machine system including a first machine and a second machine in communication with the first machine is provided. The second machine is configured to provide a payload to the first machine during a work cycle of the second machine. The first machine includes a frame and an energy recovery system. The energy recovery system includes a cylinder assembly. The cylinder assembly includes a cylinder member and a piston slidably disposed in the cylinder member. The piston is operatively coupled to a frame of the first machine. The piston and the cylinder member together define a chamber configured to receive a hydraulic fluid therein. The energy recover system also includes an accumulator disposed in fluid communication with the chamber to receive the hydraulic fluid and a first valve assembly disposed in fluid communication with the accumulator and the chamber. The first valve assembly is configured to regulate a flow of the hydraulic fluid from the chamber to the accumulator. The energy recovery system also includes a controller configured to communicate with the second machine and control the first valve assembly. The controller is also configured to receive a signal indicative of a parameter of a payload that is to be received by the first machine from the second machine during a work cycle of the second machine. The controller is further configured to control the first valve assembly, during the work cycle of the second machine, to at least partially open the fluid communication between the chamber and the accumulator based on the received signal.

Other features and aspects of this disclosure will be apparent from the following description and the accompanying drawings.

DETAILED DESCRIPTION

Reference will now be made in detail to specific aspects or features, examples of which are illustrated in the accompanying drawings. Wherever possible, corresponding or similar reference numbers will be used throughout the drawings to refer to the same or corresponding parts.

Figure 1:
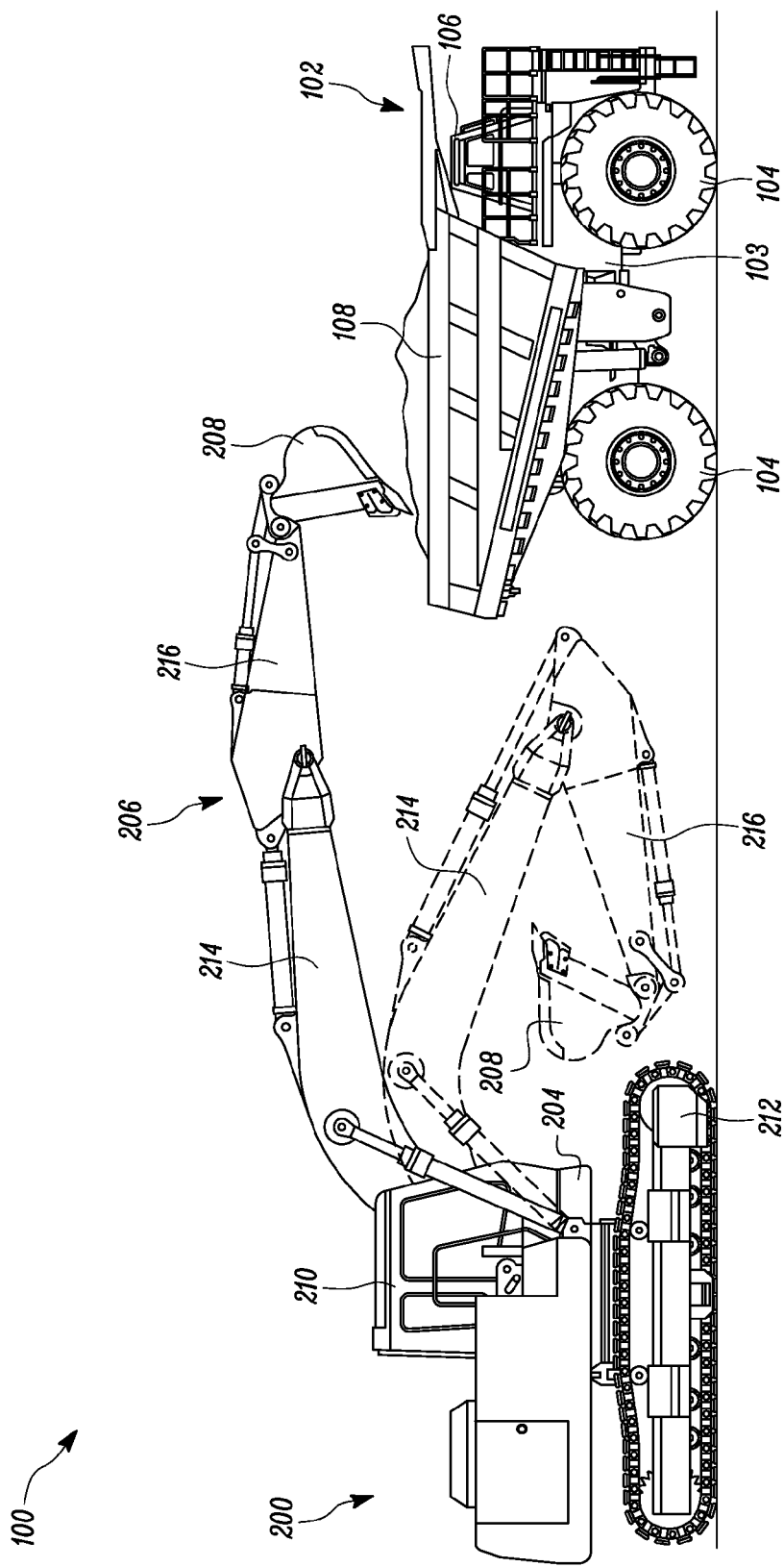
FIG. 1 illustrates a machine system showing a perspective view of a first machine and a second machine of the machine system, according to an exemplary embodiment of the present disclosure.

FIG. 1 illustrates a machine system 100, according to an embodiment of the present disclosure. In the illustrated embodiment, the machine system 100 includes a first machine 102 and a second machine 200. The first machine 102 is illustrated as a large mining truck configured to receive a payload from the second machine 200. However, the first machine 102 may embody any other machines, such as an excavator, a loader, a motor grader, and the like configured to receive the payload.

Referring to FIG. 1, the first machine 102 will now be explained in detail. The first machine 102 includes a frame 103 or a chassis configured to be supported on a set of ground engaging members 104. In the illustrated embodiment, the set of ground engaging members 104 are wheels configured to propel the first machine 102. Alternatively, the set of ground engaging members 104 may be track assemblies.

The first machine 102 includes a dump body 108 configured to receive the payload thereon. The frame 103 may be configured to support the dump body 108. In the illustrated embodiment, the dump body 108 has a box-like structure. The dump body 108 is movably coupled to the frame 103 and may be configured to move between load carrying position (shown in FIG. 1) and a dumping position (not shown). In the load carrying position, the dump body 108 may be generally parallel to the frame 103 for allowing a payload to be received therein. The dump body 108 may be further moveable to the dumping position with the dump body 108 extended upwards and away from the frame 103 for allowing the payload to be dumped at suitable locations. The first machine 102 may implement any suitable lifting mechanisms to allow the dump body 108 to be retracted and extended between the load carrying and dumping positions. For example, the lifting may be accomplished using mechanical, hydraulic and other types of mechanisms.

The first machine 102 further includes an engine (not shown) to supply power to various components including, but not limited to, the set of ground engaging members 104 and/or for moving the dump body 108. For example, the engine may drive the hydraulic pump associated with the dump body 108. The engine may embody, for example, a diesel engine, a gasoline engine, a gaseous fuel-powered engine, or any other type of combustion engine. It is contemplated that the first machine 102 may include additional power sources, such as, for example, a fuel cell, a power storage device, or another suitable source of power.

The first machine 102 further includes an operator station or cab 106 containing controls or input devices for operating the first machine 102. The cab 106 may also include one or more input devices (not shown) for propelling the first machine 102, controlling the dump body 108 and/or other machine components. In an example, the cab 106 may include input devices, such as one or more joysticks, levers, switches and pedals disposed within the cab 106 and may be adapted to receive input from an operator indicative of a desired movement of the dump body 108 and the set of ground engaging members 104.

In the illustrated embodiment, the first machine 102 is configured to receive the payload from the second machine 200. Referring still to FIG. 1, the second machine 200 will now be described in detail. The second machine 200 is illustrated as a track type excavator configured to provide the payload to the first machine 102 during a work cycle of the second machine 200. In other embodiments, the second machine 200 may be any machine, such as an excavator, a dozer, or any other on-highway or off-highway vehicle used to provide the payload to other machines for the purpose of construction, mining, quarrying, and the like.

The second machine 200 may include a frame 204 configured to be supported on a set of ground engaging members 212. In the illustrated embodiment, the set of ground engaging members 212 are track assembly configured to propel the second machine 200. Alternatively, the set of ground engaging members 212 may be wheels.

The second machine 200 may perform various earth moving operations, such as digging operation, cutting operation so as to provide the payload that may or may not be based on a repetitive cycle. The second machine 200 includes an implement 208 configured to perform the corresponding tasks at a worksite. The implement 208 may be configured to engage, penetrate, or cut the surface of the worksite and/or may be further configured to move the earth to accomplish the task. The worksite may include, for example, a mine site, a landfill, a quarry, a construction site, or any other type of worksite.

In the illustrated embodiment, the implement 208 is a bucket that may be movably mounted to the frame 204. The implement 208 may be disposed on the frame 204 at a front end of the second machine 200. The implement 208 may be configured to perform digging operation to dig material from the work site and also hold the material therein. During holding the material, the implement 208 may also be moved to reach a location for performing the dumping operation. In the illustrated embodiment, the second machine 200 may be configured to perform the dumping operation on the first machine 102 so as to provide the payload to the first machine 102.

In one embodiment, the work cycle for the second machine 200 may include a dig segment, a move-to-truck segment, a dump segment, and a move-to-trench segment. In the illustrated example, the implement 208 may be configured to perform the dumping operation so as to provide the payload to the first machine 102 during the dump segment of the work cycle. In other embodiments, the work cycle for the second machine 200 may be defined as a cycle during which the implement 208 performs at least the dumping operation. Moreover, the implement 208 may be rotated and/or raised to perform the dumping operation during the work cycle.

In the illustrated embodiment, the second machine 200 includes a linkage system 206 operatively coupled to the implement 208 and the frame 204 of the second machine 200. The linkage system 206 includes a first arm 214 and a second arm 216 pivotally coupled each other. Further, the implement 208 may be rotatably coupled to the second arm 216. The linkage system 206 may also include one or more hydraulic cylinders configured to control a movement of each of the first arm 214 and the second arm 216. The linkage system 206 may be configured to lift and lower the implement 208. Further, the linkage system 206 may also be configured to rotate the implement 208.

In various other examples, the implement 208 may be coupled to the machine using other types of linkage systems and/or assemblies so as to perform the operations. Further, the implement 208 may be configured to pivot, rotate, slide, swing, and/or move relative to the frame 204 of the second machine 200 in any other manner. In various other embodiments, the implement 208 may include any device used in the performance of the task described above. For example, the implement 208 may include a blade, a bucket, a shovel, a hammer, an auger, a ripper, or any other task-performing device based on a type of the application.

The second machine 200 may further include a power source (not shown) to supply power to various components including, but not limited to, the set of ground engaging members 212, and the implement 208. In an example, the power source may be an engine. The engine may embody, for example, a diesel engine, a gasoline engine, a gaseous fuel-powered engine, or any other type of combustion engine. It is contemplated that the power source may alternatively embody a non-combustion source of power (not shown) such as, for example, a fuel cell, a power storage device, or another suitable source of power.

The second machine 200 may further include an operator station or cab 210 containing controls or input devices for operating the second machine 200. The cab 210 may also include one or more input devices (not shown) for propelling the second machine 200, controlling the implement 208 and/or other machine components. In an example, the one or more input devices may include one or more joysticks, levers, switches and pedals disposed within the cab 210 and may be adapted to receive input from an operator indicative of a desired movement of the implement 208 and the set of ground engaging members 212. In an embodiment, the cab 210 may include an input device (not shown) such as, a joystick, or a control button operable to generate commands for the implement 208 corresponding to performing the work cycle.

Figure 2:
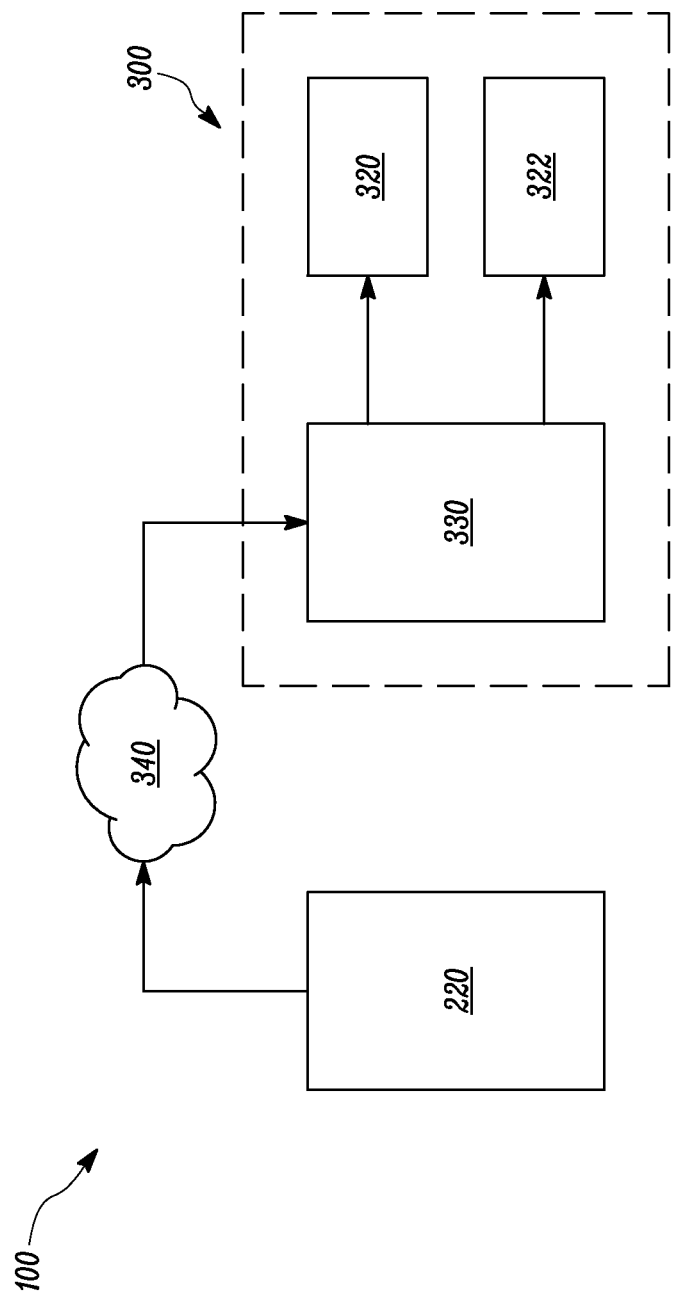
FIG. 2 is a block diagram of the machine system, according to an embodiment of the present disclosure.

Referring to FIG. 2, the second machine 200 may be associated with a control system 220 that may be on-board or remotely located. The control system 220 may accordingly include a control module and an associated memory or a database. The control system 220 may be configured to receive various signals that may be indicative of parameters related to the operation of the second machine 200 and/or the implement 208. Further, the control system 220 may also be configured to provide control signals corresponding to perform various operations.

In an embodiment, the control system 220 may include a pattern recognition module configured to detect a current operation or task being performed by the second machine 200. Further, the pattern recognition module may classify the current operation as one of the segments of the work cycle based on various signals received from sensors disposed in the second machine, engine parameters and associated maps or reference tables stored in the memory.

In an embodiment, the control system 220 may also be configured to receive the command to perform the dumping operation for the work cycle and accordingly operate the implement 208. In another embodiment, the control system 220 may operate the implement 208 to automatically perform various tasks including the dumping operation in a predetermined sequence.

The control system 220 may also include a communication module (not shown) configured to communicate the first machine 102 with the second machine 200. In an example, the communication module may be disposed on the second machine 200. In another example, the communication module may be remotely located with respect to the second machine 200. The communication module may be configured to provide a data link to the first machine 102. The communication module may utilize either proactive routing protocols or location-oriented reactive routing protocols to forward data packets according to type of information being transmitted to the first machine 102. In an embodiment, the control system 220 may be an electronic control module (ECM) of the second machine 200.

The first machine 102 includes an energy recovery system 300. The energy recovery system 300 may be configured to recover kinetic energy due to a motion of the frame 103 of the first machine 102 while receiving the payload. In the illustrated embodiment, the first machine 102 is configured to receive the payload from the second machine 200 during the work cycle of the second machine 200, specifically during the dump segment of the work cycle.

The energy recovery system 300 includes a controller 330 configured to be in communication with the second machine 200. The controller 330 may be an electronic controller that performs various operations, such as execution of control algorithms, storage and retrieval of data, and other desired operations. The controller 330 may include or access memory, secondary storage devices, processors, and any other components for running an application. The memory and secondary storage devices may be in the form of read-only memory (ROM) or random access memory (RAM) or integrated circuitry that is accessible by the controller 330. Various other circuits may be associated with the controller 330, such as power supply circuitry, signal conditioning circuitry, driver circuitry, and other types of circuitry.

The controller 330 may be a single controller or may include more than one controller 330 disposed to control various functions and/or features of the first machine 102. In an embodiment, the controller 330 may include one or more controllers and/or microprocessors that may be associated with the first machine 102 and that may cooperate in controlling various functions and operations of the first machine 102. The functionality of the controller 330 may be implemented in hardware and/or software without regard to the functionality employed. The controller 330 may also use one or more data maps relating to the operating conditions of the first machine 102 that may be stored in the memory of the controller 330.

In one embodiment, the controller 330 may be configured to communicate with the second machine 200 via a communication network 340. The communication network 340 may include a wide area network (WAN), a local area network (LAN), an Ethernet, an Internet, an Intranet, a cellular network, a satellite network, a machine-to-machine ad-hoc network or any other suitable network for transmitting data between the control system 220 of the second machine 200 and the controller 330 of the first machine 102. In various embodiments, the communication network 340 may include a combination of two or more of the aforementioned networks and/or other types of networks. The communication network 340 may be implemented as a wired network, a wireless network or a combination thereof.

Further, the data transmission may take place over the communication network 340 with a network protocol such that the data transmission is in an encrypted format, any other secure format, or in any of a wide variety of other manners. As discussed above, the communication module of the control system 220 for the second machine 200 may utilize either proactive routing protocols or location-oriented reactive routing protocols to forward data packets according to type of information being transmitted to the first machine 102.

The controller 330 may be configured to determine an occurrence of the work cycle of the second machine 200 based on inputs received via the communication network 340. Specifically, the controller 330 may also be configured to determine an occurrence of the dump segment of the work cycle. In one embodiment, the controller 330 may be configured to receive a signal indicative of the occurrence of the dump segment of the work cycle from the control system 220 of the second machine 200.

In another embodiment, the controller 330 may be configured to receive data indicative of movement of the implement 208 and/or the linkage system 206. Accordingly, the controller 330 may be configured to determine the occurrence of the dump segment based on the movement of the implement 208 and/or the linkage system 206. In another embodiment, the controller 330 may be configured to monitor user inputs, received by the second machine 200 that is indicative of providing the payload onto the first machine 102. In various other embodiments, the controller 330 may determine the occurrence of the work cycle and/or the dump segment based on other suitable parameters received from the second machine 200.

During loading of the first machine 102, as the payload increases, the dump body 108 may be displaced downwardly towards the ground engaging members 104. In the illustrated embodiment, the first machine 102 may include one or more springs to provide the damped oscillatory motion of the frame 103 and/or the dump body 108. The springs may be operatively coupled to the frame 103 of the first machine 102. The springs may be configured to compress when the frame 103 is displaced in the downward direction. The energy recovery system 300 may be configured to recover kinetic energy due to a motion of the frame 103 of the first machine 102 while receiving the payload which will be described in detail with reference to FIGS. 2 and 3.

Figure 3:
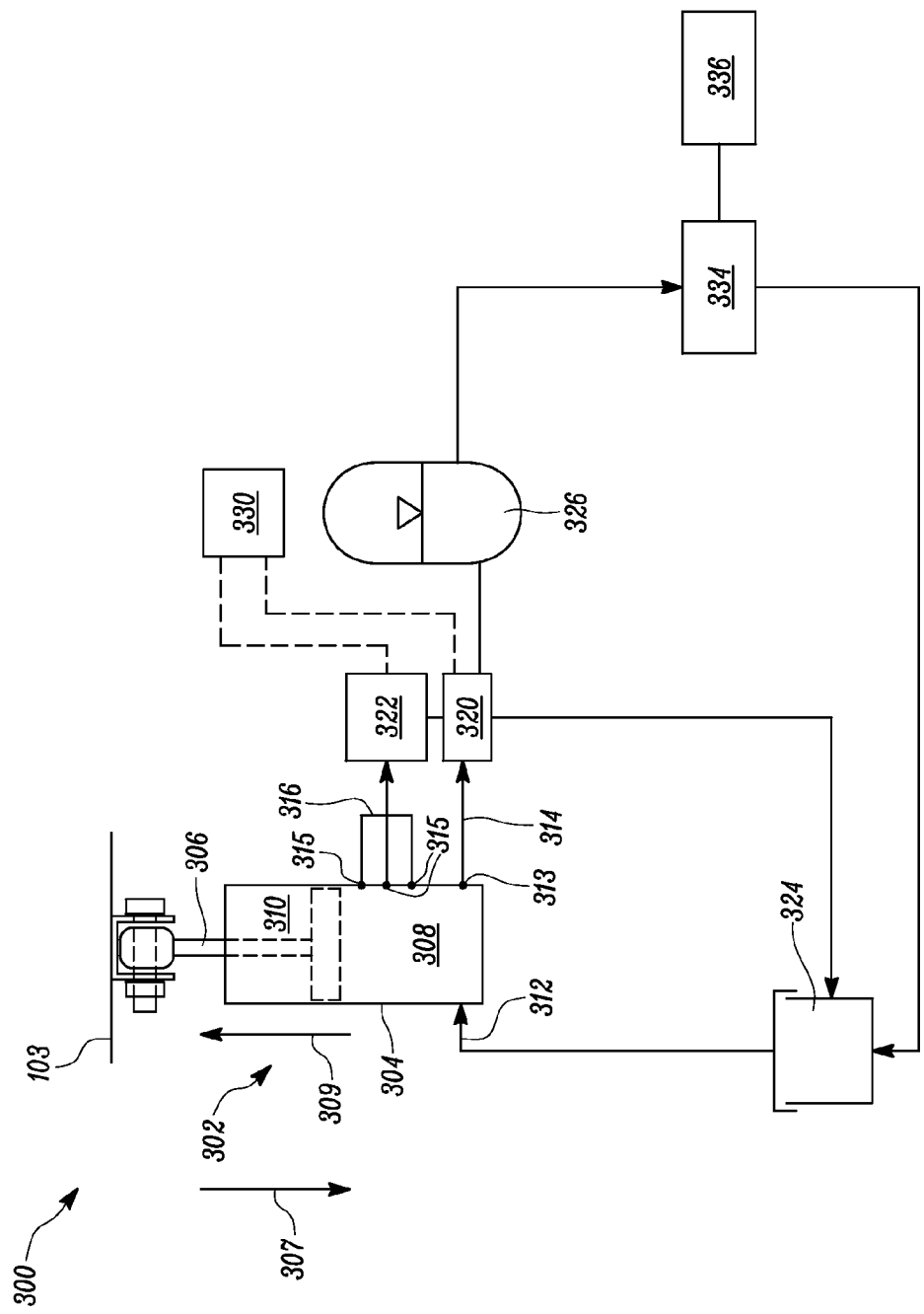
FIG. 3 is a block diagram of an energy recovery system of the first machine, according to an embodiment of the present disclosure.

Referring to FIGS. 2 and 3, the energy recovery system 300 includes a cylinder assembly 302. In an embodiment, the cylinder assembly 302 may be associated with the springs so as to selectively dampen the oscillatory motion. It may be appreciated that the first machine 102 may include any number of springs that may be arranged in any suitable configurations with respect to the cylinder assembly 302.

The cylinder assembly 302 includes a cylinder member 304 and a piston 306 slidably disposed in the cylinder member 304. The piston 306 is operatively coupled to the frame 103 of the first machine 102. In the illustrated embodiment, the piston 306 is coupled to the frame 103 using fasteners such as, brackets, bolts and the like. Further, the piston 306 may also be configured to have the extending movement in a first direction 307 inside the cylinder member 304 due to the downward motion of the frame 103. The piston 306 may further be configured to retract inside the cylinder member 304 in a second direction 309 opposite to the first direction 307.

The cylinder member 304 and the piston 306 together define a chamber (hereinafter referred to as "the first chamber 308"). The cylinder member 304 may also define a second chamber 310 adjacent to the first chamber 308. In the illustrated embodiment, the cylinder member 304 may be oriented such that the extending movement of the piston 306 inside the cylinder member 304 extends the second chamber 310. Similarly, a retracting movement of the piston 306 inside the cylinder member 304 extends the first chamber 308. Moreover, the second chamber 310 of the cylinder member 304 may be proximate to the frame 103 while the first chamber 308 may be distal to the frame 103.

The first chamber 308 is configured to receive a hydraulic fluid therein. The first chamber 308 may be in fluid communication with a fluid reservoir 324 to receive the hydraulic fluid. The fluid reservoir 324 may be in communication with the first chamber 308 via an inlet conduit 312. The second chamber 310 may be an open cavity. Accordingly, during the retracting movement of the piston 306 in the second direction 309, the hydraulic fluid may flow into the first chamber 308 from the fluid reservoir 324.

The first chamber 308 is also configured to be in fluid communication with an accumulator 326. The accumulator 326 may be configured to store a pressurized hydraulic fluid therein. In one example, the accumulator 326 may store the hydraulic fluid at a predetermined pressure. In another example, the pressure of the hydraulic fluid in the accumulator 326 may vary. The first chamber 308 may be fluidly connected to the accumulator 326 via an outlet conduit 314. The first chamber 308 may define a first orifice 313 distal to the second chamber 310. The outlet conduit 314 may be fluidly coupled to the first orifice 313 of the first chamber 308.

The energy recovery system 300 also includes a first valve assembly 320 disposed in fluid communication with the accumulator 326 and the first chamber 308. In the illustrated embodiment, the first valve assembly 320 may be disposed in the outlet conduit 314. The first valve assembly 320 is configured to regulate a flow of the hydraulic fluid from the first chamber 308 to the accumulator 326. The first valve assembly 320 may also be in fluid communication with the fluid reservoir 324.

In the illustrated embodiment, the first chamber 308 also defines multiple second orifices 315 proximate to the second chamber 310. In an example, a diameter of each of the second orifices 315 may progressively decrease along the first direction 307. As such, the piston 306 may be configured to block the second orifices 315 of larger diameter and subsequently the second orifices 315 of lesser diameter and then the first orifice 313, while moving in the first direction 307 inside the cylinder member 304. Alternatively, a diameter of the second orifices 315 may progressively increase along the first direction 307. Further, each of the second orifices 315 may be fluidly coupled to each other via a manifold 316. In an embodiment, a diameter of the first orifice 313 may be greater than a maximum diameter among the diameters of each of the second orifices 315.

In the illustrated embodiment, the energy recovery system 300 may also include a second valve assembly 322 in fluid communication with each of the second orifices 315. The second valve assembly 322 may be disposed in the manifold 316. Further, the second valve assembly 322 may also be in fluid communication with the first valve assembly 320. Alternatively, the second valve assembly 322 may be fluidly coupled to the fluid reservoir 324. The second valve assembly 322 is configured to regulate a flow of the hydraulic fluid from at least one of the second orifices 315 to the first valve assembly 320 and/or the fluid reservoir 324.

It may be appreciated that the energy recovery system 300 may include one or more check valves (not shown) to ensure flow in required directions while blocking the flow in other directions. In an example, the check valve may be disposed to allow a flow of the hydraulic fluid only in one direction i.e., from the fluid reservoir 324 to the first chamber 308. Further, the check valves may also be disposed to allow a flow of the hydraulic fluid only in a direction from the first chamber 308 to either the first valve assembly 320 and/or the second valve assembly 322.

In one embodiment, the second valve assembly 322 may be a 2-way shut-off valve disposed in the manifold 316 to provide a fluid communication between the second orifices 315 and the first valve assembly 320. In another embodiment, the second valve assembly 322 may include a series of 2-way valves associated with each of the second orifices 315 and disposed in communication with the first valve assembly 320. Accordingly, theses valves may be configured to allow or block the fluid communication with the corresponding second orifice 315 and the first valve assembly 320. Alternatively, the second valve assembly 322 may include one or more proportional valves.

The first valve assembly 320 may embody any valve or set of valves configured to operate the first valve assembly 320 in at least two configurations, namely, a first configuration and a second configuration. In the first configuration, the first valve assembly 320 may allow the fluid communication between the second valve assembly 322 and the fluid reservoir 324 and block the fluid communication between the outlet conduit 314 and the accumulator 326. In the second configuration, the first valve assembly 320 may at least partially allow the fluid communication between the outlet conduit 314 and the accumulator 326 via the outlet conduit 314 and block the fluid communication between the second valve assembly 322 and the fluid reservoir 324. In one example, the first valve assembly 320 may partially open the fluid communication between the first chamber 308 and the accumulator 326 via the outlet conduit 314 in the second configuration. In one example, the first valve assembly 320 may fully open the fluid communication between the first chamber 308 and the accumulator 326 in the second configuration. Further, the first valve assembly 320 may be configured to regulate a pressure of the hydraulic fluid in the outlet conduit 314.

In the illustrated embodiment, the first valve assembly 320 may be configured to be electronically actuated. In an example, the first valve assembly 320 may be solenoid actuated, proportional valve. In an embodiment, the first valve assembly 320 may be a 4-way, 2 position valve. In another embodiment, the first valve assembly 320 may include multiple 2-way valves so as to operate the first valve assembly 320 in the first configuration and the second configuration. However, it may also be envisioned to implement other types of suitable valves or valve assemblies for each of the first valve assembly 320 and the second valve assembly 322 based on a type of application.

The energy recovery system 300 may be configured to operate in each of a passive dampen mode and an energy recovery mode. In the passive dampen mode, during the extending movement of the piston 306, the hydraulic fluid may selectively flow out of the first chamber 308 through the one or more of the second orifices 315. Accordingly, in the passive dampen mode, the second valve 322 may be at an open configuration to effect the fluid communication between the second orifices 315 and the first valve assembly 320. Further, the first valve assembly 320 may be in the first configuration, allowing the fluid communication between the second valve assembly 322 and the fluid reservoir 324 and blocking the fluid communication between the outlet conduit 314 and the accumulator 326. A person of ordinary skill in the art will understand that a restricted flow of the hydraulic fluid through any of the second orifices 315 may slow down the movement of the springs thereby dampening the oscillatory motion of the frame 103. In the passive dampen mode, the hydraulic fluid slowly passes through the second orifices 315 thereby converting the mechanical energy into heat. Therefore, no energy may be recovered at the passive dampen mode.

When the frame 103 moves upward in the direction 309 due to the force of springs, more hydraulic flow may be pulled from fluid reservoir to the first chamber 308. In an embodiment, the energy recovery system may include a check valve to ensure that a flow direction is from the fluid reservoir 324 to the first chamber 308. Such a configuration provides a relatively soft response to the compression i.e., when the piston 310 moves along the direction 307, and a relatively stiff response to the extension i.e., when the piston 310 moves along the direction 309. The soft response to the compression may ensure a smooth ride, and the stiff response to the extension can effectively control the rebound of the coil springs or leaf springs.

In the energy recovery mode, during the extending movement of the piston 306, the hydraulic fluid may selectively flow out of the first chamber 308 through the first orifice 313. The energy recovery mode will be explained in detail herein. At the energy recovery mode, the first valve assembly 320 is in the second configuration thereby allowing the fluid communication between the first chamber 308 and the accumulator 326 via the first orifice 313 and the outlet conduit 314. Further, the second valve 322 is in the closed configuration to block the fluid communication between the second orifices 315 and the first valve assembly 320. As such, when the hydraulic fluid is pressed in the first chamber 308, the hydraulic fluid may be allowed to exit the second chamber via the first orifice 313 only.

In one embodiment, there may be a check valve between the first valve assembly 320 and the accumulator 326. In another embodiment, the energy recovery system 300 may be implemented with no check valve between the first valve assembly 320 and the accumulator 326 by enabling precise control. In such a case, the flow direction between the first valve assembly 320 and the accumulator 326 may be controlled by the operating timing of the first valve assembly 320.

The controller 330 is configured to receive, a signal indicative of a parameter of the payload that is to be received by the first machine 102 during the work cycle of the second machine 200. In one embodiment, the parameter of the payload may be a weight of the payload. In another embodiment, the parameter may be a component of force that may act on the frame 103 due to the payload in the first direction 307.

The controller 330 is further configured to control the first valve assembly 320, during the dump segment of the work cycle of the second machine 200 to at least partially open the fluid communication between the first chamber 308 and the accumulator 326 via the outlet conduit 314 based on the received signal. Moreover, the controller 330 may determine a percentage of opening of the fluid communication between the chamber and the accumulator 326 based on the parameter of the payload. In an embodiment, the controller 330 may further block the fluid communication between the second valve assembly 322 and the fluid reservoir 324.

The controller 330 may be configured to detect if the dump segment of the work cycle is being performed. According to one embodiment, the controller 330 may be configured to receive a signal indicative of the dump segment from the control system 220 to detect an occurrence of the dump segment of the work cycle of the second machine 200. According to another embodiment, the controller 330 may be configured to detect an occurrence of the dump segment of the work cycle, by monitoring various parameters of the second machine 200, such as, a fluid pressure of the hydraulic pump associated with the implement 208, parameters related to a transmission system of the second machine 200. In yet another embodiment, the controller 330 may detect a start of the dump segment of the work cycle by determining that the implement 208 is being tilted in a particular direction after engaging the payload.

In an embodiment, the controller 330 may be configured to control the first valve assembly 320 to open the fluid communication between the chamber and the accumulator 326 at a start of each of the dump segment of the work cycle. In another embodiment, the controller 330 may be configured to control the first valve assembly 320 to open the fluid communication between the chamber and the accumulator 326 after a start of each of the dump segment of the work cycle based on the parameter of the payload.

Further, the pressurized hydraulic fluid in the accumulator 326 may be used to drive various components and/or converted to other forms of energy for example, electrical energy, mechanical energy and the like. In the illustrated embodiment, the accumulator 326 is disposed in fluid communication with a hydraulic motor 334 associated with a transmission 336 of the first machine 102. The transmission 336 may be drivably coupled to the engine for receiving power therefrom and may be configured to drive the set of ground engaging members 104 of the first machine 102. The transmission 336 may be a Continuously Variable Transmission (CVT), an Infinite Variable Transmission (IVT) or any other types of transmission systems.

The energy recovery system 300 may include various other components such as, check valves, relief valves, pressure gauges, sensors and the like that may be suitably configured to perform various other function depending on the type of application. In an example, the accumulator 326 may be fluidly coupled to a relief valve or a manual vent line configured to reduce a pressure of the hydraulic fluid inside the accumulator 326 if the pressure is greater than or equal to a threshold pressure.

Although, a single second machine 200 is illustrated and described, it may be recognized that the machine system 100 may include multiple second machines configured to provide payloads to the first machine 102 during corresponding work cycles. In one example, some of the second machines 200 may provide the payload simultaneously. In such a case, the controller 330 may receive parameters related to the payload from each of these second machines 200. Accordingly, the controller 330 may control the first and second valve assemblies 320, 322. For example, the controller 330 may determine a total parameter, for example total weight of the payloads to be received from each of these second machines 200 and further controls the first and second valve assemblies 320, 322 based on the total parameter. In another example, the controller 330 may determine total vertical forces that may act on the frame 103 due to each of the payloads and further controls the first and second valve assemblies 320, 322 based on the total parameter.

In one embodiment, the energy recovery system 300 may be selectively activated based on a user input. For example, the machine may include a control element such as, a switch, a button or the like that may allow a user to provide input corresponding to activating or deactivating the energy recovery system 300. In such a case, the controller 330 may activate the energy recovery system 300 upon receiving the user input via the control element. In the activated state, as discussed above, the controller 330 may control the first and second valve assemblies 320, 322 based on the parameter of the payload during the work cycle. The controller 330 may also determine the occurrence of the work cycle by communicating with the second machine 200.

However, in the deactivated state, the energy recovery system 300 may only operate at the passive dampen mode to dampen the vibrations due to a movement of the frame 103. Moreover, the controller 330 may also be configured to switch from the energy recovery mode to the passive dampen mode under predetermined conditions. In an example, the predetermined condition may include the parameter of the payload exceeding a threshold value.

INDUSTRIAL APPLICABILITY

Figure 4:
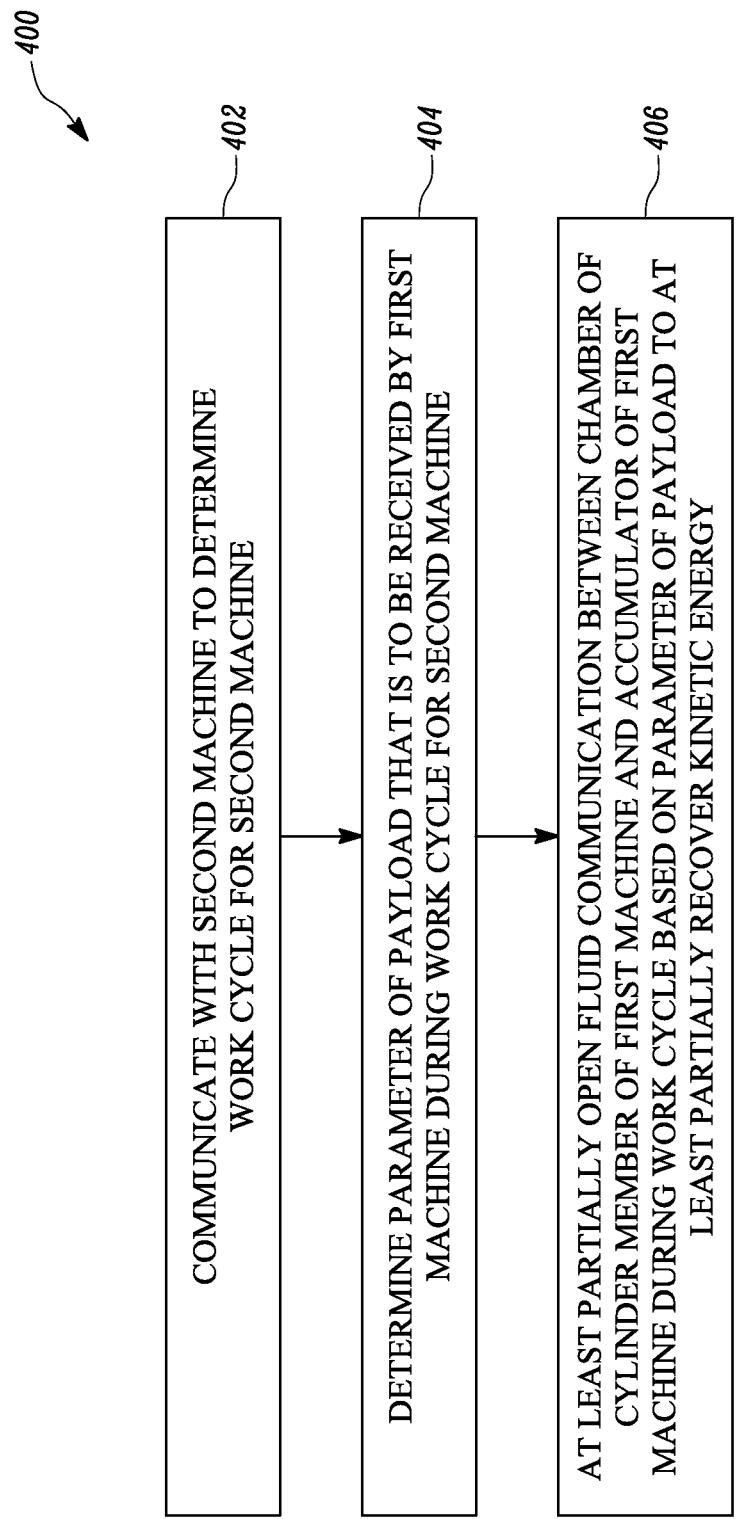
FIG. 4 is a flowchart for a method of recovering a kinetic energy due to a motion of a frame of the first machine while receiving a payload from the second machine, according to an embodiment of the present disclosure.

Referring to FIG. 4, a method 400 of recovering a kinetic energy due to a motion of a frame of a first machine while receiving a payload from a second machine is illustrated. The method 400 will be explained in conjunction with the first machine 102 and the second machine 200 of FIG. 1. However, it may be envisioned to implement the method 400 in any other machines configured to communicate with each other. In an embodiment, one or more steps of the method 400 may be implemented by the controller 330.

The method 400 may include implementing one of the passive dampen mode and the energy recovery mode as described above, for the first machine 102. One or more steps of the method 400 may be implemented as will be described below to operate the energy recovery system 300 in the energy recovery mode. The energy recovery mode may be implemented when the first machine 102 receives the payload from the second machine 200. However, in some cases, the energy recovery mode may also be implemented during transportation of the payload. In these cases, the method 400 may include determining parameters related to irregularities of the road.

At step 402, the method 400 includes communicating with the second machine 200 to determine a work cycle for the second machine 200. The second machine 200 is configured to provide the payload to the first machine 102 during the work cycle. As discussed above, the controller 330 may be configured to communicate with the second machine 200 over the communication network 340. Accordingly, the controller 330 may determine the occurrence of the work cycle.

At step 404, the method 400 includes determining a parameter of the payload that is to be received by the first machine 102 during the work cycle for the second machine 200. In an embodiment, the parameter may be a weight of the payload. At step 406, the method 400 includes at least partially opening a fluid communication between the first chamber 308 of the cylinder member 304 of the first machine 102 and the accumulator 326 of the first machine 102 during the work cycle based on the parameter of the payload to at least partially recover the kinetic energy. As discussed above, the first chamber 308 is configured to receive the hydraulic fluid therein. The accumulator 326 is configured to receive and store the pressurized hydraulic fluid.

In an example, the diameter of the first orifice 313 may be larger than the maximum diameter of the second orifices 315. Further, the outlet conduit 314 may have a sufficient length such that there may be less restriction and energy loss when the hydraulic fluid in the first chamber 308 is passed via the first orifice 313 and the outlet conduit 314 into the accumulator 326.

At step 406, the method 400 may further include restricting the fluid communication between the second orifices 315 and the fluid reservoir 324 during the work cycle of the second machine 200. Specifically, the controller 330 may actuate the first valve assembly 320 so as to allow the fluid communication between the first chamber 308 and the accumulator 326 via the first orifice 313 and the outlet conduit 314.

The method 400 may also include supplying the pressurized hydraulic fluid from the accumulator 326 to drive various components. In an example, the pressurized hydraulic fluid from the accumulator 326 may be used to drive the hydraulic motor 334 associated with the transmission 336 of the first machine 102. Further, an electric generator may be operatively coupled to the hydraulic motor 334 to thereby generate electric energy. In another example, the pressurized hydraulic fluid may be used to drive linkage mechanisms associated with the dump body 108. In yet another example, the energy stored in the accumulator 326 may be used to adjust a position of the swash plate associated with a continuously variable transmission.

With the implementation of the energy recovery system 300 and/or the method 400, the kinetic energy due to a movement of the frame 103 may be recovered during receiving the payload. Moreover, by operating the energy recovery system 300 based on the parameter related to the payload, certain amount of damping for the oscillations may also be allowed thereby avoiding plastic deformation to the springs.

Moreover, as discussed above, by providing a larger diameter for the first orifice 313, a restriction may be decreased when the hydraulic fluid passes through the first orifice 313 and the outlet conduit 314. Further, the pressure in the outlet conduit 314 may be suitably adjusted based on the opening degree of the first valve assembly 320 according to the parameter related to the payload that is to be received by the first machine 102 from the second machine 200 during the work cycle of the second machine 200. A person of ordinary skill in the art will understand that the adjustable backpressure provides benefits for energy recovery efficiency by minimizing unnecessary restriction. The adjustable backpressure may also ensure that the impact to the coil springs or leaf springs are within the normal operating range to avoid the plastic deformation of the these springs.

The method 400 may further include switching to the passive dampen mode when the parameter of the payload may not be accurately determined, or based on the parameter for the payload or during other conditions. For example, when the weight of the payload is greater than a threshold value, the passive dampen mode may be implemented. Moreover, the energy recovery system 300 may be configured to perform at the passive dampen mode when the first machine 102 is travelling so as to function as a shock absorber. As such, it may not be necessary to determine irregularities of the road on which the first machine 102 is travelling. Furthermore, the method 400 may also include determining if the accumulator 326 has exceeded a storage capacity and accordingly switching to the passive dampen mode.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An energy recovery system for a first machine in communication with a second machine, the energy recovery system comprising:
a cylinder assembly comprising:
a cylinder member; and
a piston slidably disposed in the cylinder member, the piston operatively coupled to a frame of the first machine, wherein the piston and the cylinder member together defines a chamber receiving a hydraulic fluid therein;
an accumulator disposed in fluid communication with the chamber to receive the hydraulic fluid, wherein the accumulator stores a pressurized hydraulic fluid therein;
a first valve assembly disposed in fluid communication with the accumulator and the chamber, the first valve assembly regulating a flow of the hydraulic fluid from the chamber to the accumulator; and
a controller configured to communicate with the second machine and control the first valve assembly, the controller configured to:
receive a signal indicative of a parameter of a payload that is to be received by the first machine from the second machine during a work cycle of the second machine; and
control the first valve assembly, during the work cycle of the second machine, to at least partially open the fluid communication between the chamber and the accumulator based on the received signal,
wherein an amount of opening of the fluid communication is based on the parameter of the payload.

2. The energy recovery system of claim 1 further comprising a fluid reservoir that supplies the hydraulic fluid to the chamber, wherein the first valve assembly regulates a flow of the hydraulic fluid between the fluid reservoir and the chamber.

3. The energy recovery system of claim 2, wherein the chamber defines a first orifice disposed in fluid communication with the first valve assembly.

4. The energy recovery system of claim 3 further comprising a second valve assembly disposed in communication with the chamber and the fluid reservoir, the second valve assembly configured to regulate a flow of the hydraulic fluid from the chamber to the fluid reservoir.

5. The energy recovery system of claim 4, wherein the chamber further defines a second orifice disposed adjacent to the first orifice, wherein the second orifice is configured to fluidly communicate the chamber with the second valve assembly.

6. The energy recovery system of claim 5, wherein the controller is further configured to control the second valve assembly to restrict the fluid communication between the chamber and the fluid reservoir during the work cycle of the second machine.

7. The energy recovery system of claim 5, wherein a diameter of the first orifice is greater than a diameter of the second orifice.

8. The energy recovery system of claim 1, wherein the controller is configured to receive the signal via a wireless network between the first machine and the second machine.

9. The energy recovery system of claim 1 further comprising a hydraulic motor in fluid communication with the accumulator to receive the pressurized hydraulic fluid, wherein the hydraulic motor is driven by the pressurized hydraulic fluid.

10. A machine system comprising:
a first machine; and
a second machine in communication with the first machine, the second machine providing a payload to the first machine during a work cycle of the second machine,
wherein the first machine comprises:
a frame; and
an energy recovery system comprising:
a cylinder assembly comprising:
a cylinder member; and
a piston slidably disposed in the cylinder member, the piston operatively coupled to the frame of the first machine, wherein the piston and the cylinder member together define a chamber receiving a hydraulic fluid therein;
an accumulator disposed in fluid communication with the chamber to receive the hydraulic fluid, wherein the accumulator stores the pressurized hydraulic fluid;
a first valve assembly disposed in fluid communication with the accumulator and the chamber, the first valve assembly regulating a flow of the hydraulic fluid from the chamber to the accumulator; and
a controller configured to be in communication with the second machine and control the first valve assembly, the controller configured to:
receive a signal indicative of a parameter of a payload that is to be received by the first machine from the second machine during a work cycle of the second machine; and
control the first valve assembly, during the work cycle of the second machine, to at least partially open the fluid communication between the chamber and the accumulator based on the received signal,
wherein an amount of opening of the fluid communication is based on the parameter of the payload.

11. The machine system of claim 10, wherein the energy recovery system further comprises a fluid reservoir supplying the hydraulic fluid to the chamber, wherein the first valve assembly regulates a flow of the hydraulic fluid between the fluid reservoir and the chamber.

12. The machine system of claim 11, wherein the chamber defines a first orifice disposed in fluid communication with the first valve assembly.

13. The machine system of claim 12, wherein the energy recovery system further comprises a second valve assembly disposed in communication with the chamber and the fluid reservoir, the second valve assembly regulates a flow of the hydraulic fluid from the chamber to the fluid reservoir.

14. The machine system of claim 13, wherein the chamber further defines at least one second orifice disposed adjacent to the first orifice, wherein the at least one second orifice is configured to fluidly communicate the chamber with the second valve assembly.

15. The machine system of claim 13, wherein the controller is further configured to control the second valve assembly to restrict the fluid communication between the chamber and the fluid reservoir during the work cycle of the second machine.

16. The machine system of claim 13, wherein a diameter of the first orifice is greater than a diameter of the second orifice.

17. The machine system of claim 10, wherein the second machine includes a control module communicably coupled to the controller via a communication network.

* * * * *